(12) United States Patent
Bennett, III et al.

(10) Patent No.: US 7,940,907 B2
(45) Date of Patent: *May 10, 2011

(54) METHOD, SYSTEM, AND ARTICLE FOR PLACING A TELEPHONE CALL TO A PREVIOUSLY-CALLED PARTY

(75) Inventors: Raymond Walden Bennett, III, Naperville, IL (US); Robert Wesley Bossemeyer, Jr., St. Charles, IL (US); Gayle Roberta Ekstrom, Chicago, IL (US); Laura Marie Griffith, Dundee, IL (US); Edmond W. Israelski, Lake Barrington, IL (US); Denise Violetta Kagan, Riverwoods, IL (US); Richard Peter Krupka, Barrington, IL (US); Donald Bernard Liebrecht, West Dundee, IL (US); Jordan Howard Light, Chicago, IL (US); Karen Jeanne Pelletier, Crystal Lake, IL (US); Michael Steven Pickard, Highland Park, IL (US); Bruce Edward Stuckman, Algonquin, IL (US); Barry James Sullivan, Long Grove, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 11/683,826

(22) Filed: Mar. 8, 2007

(65) Prior Publication Data
US 2007/0274493 A1 Nov. 29, 2007

Related U.S. Application Data

(63) Continuation of application No. 09/293,266, filed on Apr. 16, 1999, now Pat. No. 7,203,296.

(51) Int. Cl.
*H04M 15/06* (2006.01)
(52) U.S. Cl. ............... 379/142.15; 379/67.1; 379/88.16; 379/88.23; 379/88.25; 379/201.02; 379/354; 379/356.01
(58) Field of Classification Search ............. 379/142.15, 379/67.1, 88.16, 88.23, 88.25, 201.02, 354, 379/356.01
See application file for complete search history.

(56) References Cited

U.S. PATENT DOCUMENTS

| | | | |
|---|---|---|---|
| 5,054,051 A | 10/1991 | Hoff | |
| 5,070,525 A * | 12/1991 | Szlam et al. .................. | 379/196 |
| 5,272,748 A | 12/1993 | Davis | |
| 5,325,421 A | 6/1994 | Hou et al. | |
| 5,353,336 A | 10/1994 | Hou et al. | |
| 5,371,788 A | 12/1994 | Baals et al. | |
| 5,465,295 A | 11/1995 | Furman | |
| 5,535,258 A | 7/1996 | Joglekar et al. | |

(Continued)

FOREIGN PATENT DOCUMENTS
WO WO 97/19545 A-1 5/1997

*Primary Examiner* — Quynh H Nguyen
(74) *Attorney, Agent, or Firm* — Cantor Colburn LLP

(57) ABSTRACT

Upon receiving a service code from a calling party, a list of parties previously called by the calling party is retrieved. An audio message is generated based on the list, and communicated to the calling party. A dialed input indicating a selected party from the list is received from the calling party. Based on the dialed input, a call between the calling party and the selected party is initiated.

11 Claims, 2 Drawing Sheets

U.S. PATENT DOCUMENTS

| | | |
|---|---|---|
| 5,557,658 A | 9/1996 | Gregorek et al. |
| 5,644,624 A | 7/1997 | Caldwell |
| 5,742,669 A | 4/1998 | Lim |
| 5,745,553 A | 4/1998 | Mirville et al. |
| 5,875,240 A | 2/1999 | Silverman |
| 5,903,632 A | 5/1999 | Brandon |
| 5,930,350 A | 7/1999 | Johnson |
| 6,076,121 A | 6/2000 | Levine |
| 6,160,877 A | 12/2000 | Tatchell et al. |
| 6,212,408 B1 | 4/2001 | Son et al. |
| 6,243,459 B1 | 6/2001 | Cannon et al. |
| 6,381,474 B1 | 4/2002 | Kraft |
| 2002/0041668 A1 | 4/2002 | Bennett et al. |

\* cited by examiner

METHOD, SYSTEM, AND ARTICLE FOR PLACING A TELEPHONE CALL TO A PREVIOUSLY-CALLED PARTY

CROSS-REFERENCE TO RELATED APPLICATIONS

This patent is a continuation of U.S. patent application Ser. No. 09/293,266, filed on Apr. 16, 1999 now U.S. Pat. No. 7,203,296, titled "Method, System and Article for Placing A Telephone Call to a Previously-Called Party," now issued as U.S. Pat. No. 7,203,296, the content of which is hereby incorporated by reference for all purposes.

TECHNICAL FIELD

The present invention relates to methods, systems, and articles for placing a telephone call to a previously-called party.

BACKGROUND OF THE INVENTION

Some cellular telephones and other customer premises equipment (CPE) are equipped with memories for storing previous-dialed numbers. In some CPE, a last-number-redial key is provided so that an end user can immediately access the last dialed number in the memory of the CPE.

A last-number-redial network service is also available to redial a previously-dialed number. One such service, known as a repeat-dial service, may be used when an end user dials a busy telephone line. In response to end user dialing a service code, the network service functions to repeatedly dial the telephone number until the telephone line is no longer busy.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

A need exists for a network-based enhanced redial function similar to the functionality enjoyed by some cellular telephone users, which allows landline telephone users to call previously-dialed telephone numbers without having to write or memorize the numbers, and is usable with commonly-available CPE having a dialing keypad and an audio transducer.

Figure 1:
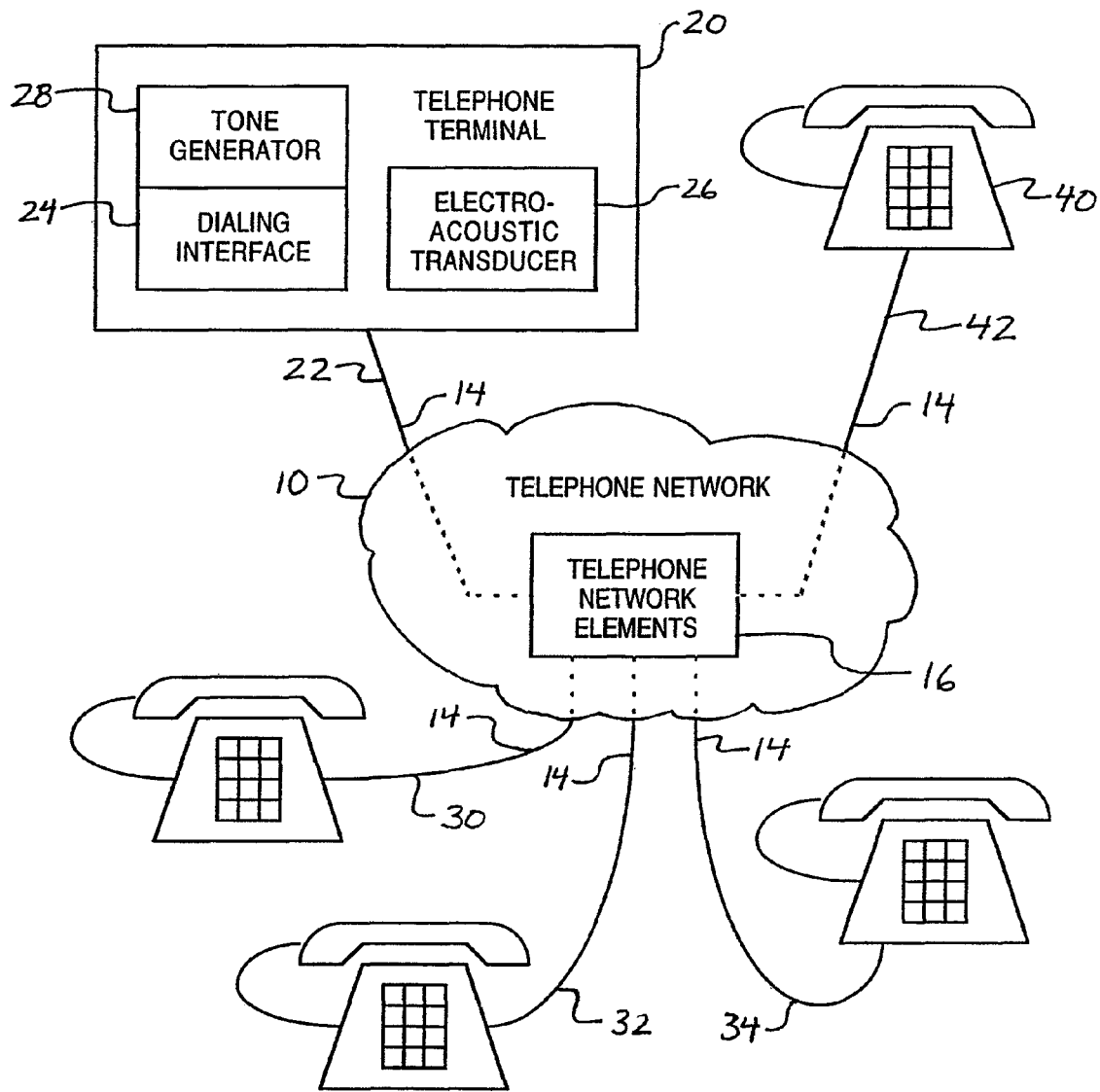
FIG. 1 is a schematic/block diagram of an embodiment of a system for placing a telephone call to a previously-called party.
Figure 2:
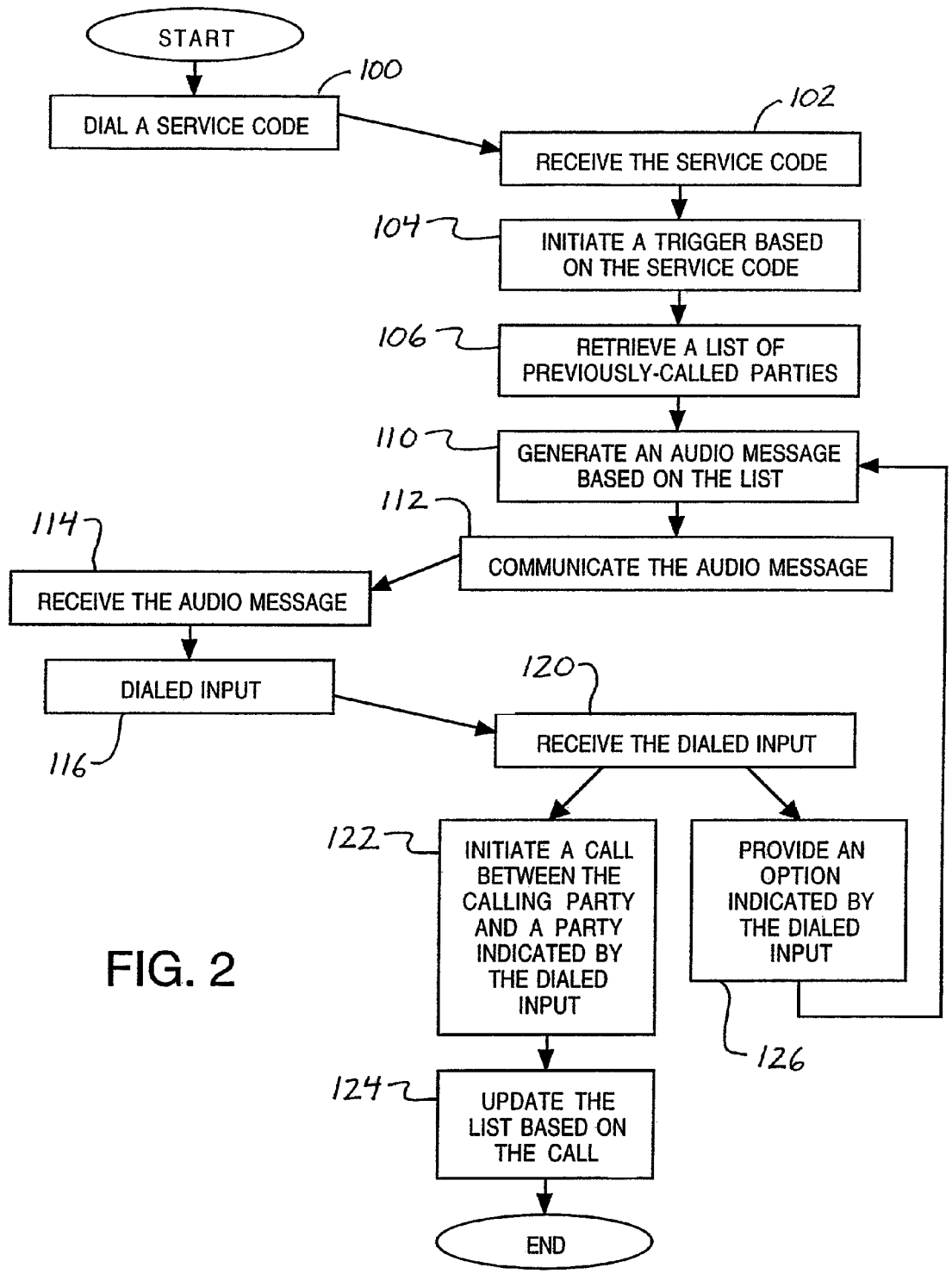
FIG. 2 is a flow chart of an embodiment of a method of placing a telephone call to a previously-called party.

The present invention provides an improved telephone service for placing a telephone call to a previously-called party. Description of embodiments of the telephone service is made with reference to both FIG. 1, which shows a schematic/block diagram of an embodiment of a system for placing a telephone call to a previously-called party, and FIG. 2, which shows a flow chart of an embodiment of a method of placing the telephone call to the previously-called party.

The telephone service is provided in conjunction with a telephone network 10. The telephone network 10, such as a public switched telephone network, serves a plurality of telephone parties. In a landline telephone network, for example, the telephone network provides a plurality of telephone lines 14 to serve the telephone parties. Each of the telephone parties and/or telephone lines 14 has a unique identifier associated therewith. In the landline telephone network, for example, each of the telephone lines 14 is identified by an associated calling party identification code or an automatic network interface (ANI) code.

The system comprises one or more telephone network elements 16 which cooperate to provide the telephone service for placing a call to a previously-called party. Examples of the one or more telephone network elements 16 include, but are not limited to, a service switching point, a service control point, a line information database, a caller name database, a previously-dialed-calls database and/or another database, an intelligent peripherals other advanced intelligent network (AIN) elements, and combinations thereof. Based upon the herein-disclosed high-level description and flow chart, one or more computer programs, such as service scripts, to direct the telephone network elements 16 to cooperate in providing the service logic are within the skill of a routineer in the art of telecommunications.

As indicated by block 100, a service code is dialed by a calling party. For purposes of illustration and example, the service code is dialed by an end user using a telephone terminal 20 connected to a telephone line 22. Examples of the telephone terminal 20 include, but are not limited to, a telephone set, a facsimile machine, and a computer having a modem.

Regardless of its specific form, the telephone terminal 20 comprises a dialing interface 24 and an electroacoustic transducer 26. Preferably, the dialing interface 24 comprises a standard telephone keypad having dialing digit keys of "0" to "9", a "*" key, and a "#" key. A tone generator 28 is responsive to the telephone keypad to generate dual-tone multi-frequency (DTMF) signals. Signals generated by the tone generator 28 are applied to the telephone line 22. The electroacoustic transducer 26 may comprise a speaker to generate audible acoustic pressure waves based upon signals received from the telephone line 22.

Using a landline telephone set, for example, the end user can take the telephone off-hook (e.g. by picking up a handset) and dial the service code using the standard telephone keypad. Advantageously, the herein-disclosed telephone service can be provided even if the telephone terminal 20 is absent of a display device and service-specific keys in addition to the standard telephone keypad.

Preferably, the service code consists of three or fewer dialed keys. For example, the service code may consist of an asterisk "*" followed by two numerical digits. Alternatively, the service code may consist of a pound "#" followed by two numerical digits. Having the service code consist of three or fewer dialed keys is desirable so that the end user need not remember another 7-digit or 10-digit telephone number to access the telephone service. In an exemplary embodiment, the service code comprises either a vertical feature code or an access code.

As indicated by block 102, the service code dialed by the calling party is received by one of the telephone network elements 16. Typically, the aforementioned telephone network element includes a switch within the telephone network 10, such as a service switching point at a central office which serves the calling party. It is noted that, in general, the service code may be received by an alternative network element.

Preferably but optionally, a telephone network trigger is initiated based upon the service code, as indicated by block

104. Preferably, the telephone network trigger comprises an AIN trigger. Typically, the telephone network trigger is detected and initiated by the service switching point described with reference to block 102. The telephone network trigger may comprise either a public office dialing plan (PODP) feature code trigger or a customized dialing plan (CDP) trigger.

In response to the telephone network trigger, the telephone network elements 16 cooperate to initiate the telephone service. The telephone network elements 16 may cooperate in a conventional manner to initiate the process of providing the herein-disclosed telephone service. For example, the service switching point may communicate a query message to a service control point or another telephone network element in response to the telecommunication network trigger. The query message may include the service code or an identifier thereof, and a unique telephone party identifier of the calling party determined using intelligence within SS7 or an alternative common channel signaling protocol. Based on the query message, the service control point may communicate a reply message back to the service switching point. The reply message includes call-handling instructions specific to the telephone service. The service switching point may handle the call based on the call-handling instructions. These call-handling instructions may include the service switching point employing an intelligent peripheral or another network element capable of providing audio messages, post-dialing digit collection, and other resources used to provide the telephone service.

As indicated by block 106, a list of parties previously called by the calling party is retrieved from a database. Typically, the database stores a plurality of such lists, wherein each list is associated with a corresponding one of a plurality of parties of the telephone network 10. Each list is automatically compiled within the telephone network 10 based on a calling history of an associated calling party. The list may be retrieved by a service control point or another of the network elements 16.

The list of parties may include either the last N parties called by the calling party, or the N most frequently-called parties by the calling party, for example, where N is a natural number greater than or equal to two. The list of parties may include a plurality of telephone numbers of the parties and/or a plurality of names of the parties.

For purposes of illustration and example, consider the list of parties previously called by the calling party to comprise parties having telephone lines denoted by reference numerals 30, 32, and 34. The telephone line 30 is associated with a fictitious individual named Jane Doe having a fictitious telephone number of 847/555-0120. The telephone line 32 is associated with a fictitious individual named John Smith having a fictitious telephone number of 312/555-0153. The telephone line 34 is associated with a fictitious individual named John Doe having a fictitious telephone number of 708/555-0147.

Also for purposes of illustration and example, it is considered that Jane Doe is the most recently called party by the calling party, John Smith is the most recently called party prior to Jane Doe, and John Doe is the most recently called party prior to John Smith.

As indicated by block 110, an audio message is generated based upon the list. The audio message may be generated by an intelligent peripheral or another of the network elements 16 capable of speech synthesis and/or speech playback. Preferably, the audio message includes verbal or spoken information indicating at least a subset of the parties from the list, and a corresponding digit for each previously-called party in the subset.

The audio message may comprise a plurality of names of parties previously called by the calling party. Based upon the aforementioned example list, the audio message may comprise the following audio message: "press 1 to call Jane Doe, press 2 to call John Smith, and press 3 to call John Doe."

The audio message may comprise a plurality of telephone numbers of parties previously called by the calling party. Using the aforementioned example list, the audio message may comprise the following audio message: "press 1 to call 847/555-0120, press 2 to call 312/555-0153, and press 3 to call 708/555-0147."

The audio message may comprise both names and telephone numbers of parties previously called by the calling party. For example, the audio message may comprise the following audio message: "press 1 to call Jane Doe at 847/555-0120, press 2 to call John Smith at 312/555-0153, and press 3 to call John Doe at 708/555-0147."

Optionally, the order of the parties in the audio message is based upon how recently each party was previously called by the calling party. Here, it is preferred that the parties in the audio message be ordered from the most recently called party (which is presented first) to the least recently called party in the subset (which is presented last).

Alternatively, the order of the parties in the audio message may be based on the names of the parties. Here, for example, the parties in the audio message may be alphabetically ordered.

As another alternative, the order of the parties in the audio message is based on a measure of how frequently each party is called by the calling party. Here, it is preferred that the parties in the audio message be ordered from the most frequently called party in the subset (which is presented first) to the least frequently called party in the subset (which is presented last).

In addition, the audio message may provide an option to repeat the list and/or an option to generate and communicate an audio message for additional previously-called parties; from the list. For example, the audio message may comprise the following audio message in addition to the above messages: "press 9 to repeat the list, and press 0 to get additional previously-called parties."

In conjunction with the option to get additional previously-called parties, the list may be segmented into subsets or portions of a limited number of parties. Each subset or portion may be limited to a maximum of three or four parties, for example. Limiting the number of parties presented in each audio message may be desirable with regard to a caller's short-term memory.

As indicated by block 112, at least a portion of the audio message is communicated to the calling party. The audio message is communicated via the telephone network 10 to the telephone line 22. The audio message may be communicated from the intelligent peripheral to the telephone line 22 via the service switching point which serves the telephone line 22.

As indicated by block 114, at least a portion of the audio message is received by the calling party. The audio message is received by the telephone terminal 20 via the telephone line 22. The audio message is made audible to the end user by the electroacoustic transducer 26 of the telephone terminal 20.

As indicated by block 116, the end user provides a dialed input using the dialing interface 24. The dialed input may indicate a selected party from the list, or another option such as to repeat the list or to get additional previously-called parties. Preferably, the dialed input consists of a single dialed key selected from the digits 0 to 9, the # key, and the * key.

As indicated by block 120, the dialed input is received from the calling party via the telephone network 10. The dialed input may be received by the intelligent peripheral via the service switching point which serves the telephone line 22. The dialed input is determined by a post-dialing digit collection/detection resource of the intelligent peripheral.

If the dialed input indicates a selected party from the list, a call is initiated between the calling party and the selected party based on the dialed input, as indicated by block 122. Optionally, the list in the database is updated to account for the call between the calling party and the selected party, as indicated by block 124.

Continuing with the above example, if the dialed input consists of the "1" key, a call is initiated between the calling party and the telephone line 30 associated with Jane Doe and having a telephone number of 847/555-0120. If the dialed input consists of the "2" key, a call is initiated between the calling party and the telephone line 32 associated with John Smith and having a telephone number of 312/555-1053. If the dialed input consists of the "3" key, a call is initiated between the calling party and the telephone line 34 associated with John Doe and having a telephone number of 708/555-0147.

If the dialed input indicates an option such as a repeat-list option or get-additional-parties option, the selected option is provided, as indicated by block 126.

Optionally, the calling party is required to enter a personal identification number (PIN) using the dialing interface 24. The PIN is used to authorize access the telephone service. In this case, access to the telephone service may be denied upon receiving an incorrect PIN. This feature is desirable to thwart an unauthorized person's attempt to use the telephone terminal 20 to learn of the previously-called parties on the list.

Optionally, the PIN is used to uniquely identify the calling party. In this case, the calling party may access the telephone service using another telephone terminal 40 coupled to another telephone line 42. Examples of the telephone terminal 40 include, but are not limited to, those listed for the telephone terminal 20. The list is retrieved from the database based upon the PIN rather than the calling party ID or ANI of the telephone line 42. This feature is desirable to allow a user to have wider access to his/her list of previously-called parties.

Embodiments of the herein-disclosed methods may be directed by computer-readable instructions encoded on a computer-readable medium. The contents of the computer-readable medium cause the one or more network elements 16 to perform the herein-disclosed acts. For this purpose, at least one computer processor associated with the one or more network elements 16 is responsive to the contents of the computer-readable medium.

Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

Thus, there has been described herein several embodiments including preferred embodiments of method, system, and article for placing a call to a previously-called party.

It will be apparent to those skilled in the art that the disclosed invention may be modified in numerous ways and may assume many embodiments other than the preferred form specifically set out and described above. For example, either in addition to or as an alternative to audibly presenting the list of previously-called parties, a visible representation of the list may be provided to the calling party. The visible representation of the list may be provided using a caller-identification display unit coupled to the telephone line 22.

Although described for use with a wireline telephone network, embodiments of the telephone service also may be used in conjunction with a wireless telephone network.

Accordingly, it is intended by the appended claims to cover all modifications of the invention which fall within the true spirit and scope of the invention.

What is claimed is:

1. A method of facilitating communication with a previously called party, the method comprising:
    generating a call history list at a telephone network element, wherein the telephone network element is configured to generate the call history list using calling party identification information;
    receiving, at the telephone network element, a dialed service code and the calling party identification information;
    retrieving the call history list including at least one previously called party, wherein the call history list is retrieved utilizing the dialed service code and the calling party identification information;
    generating an audio message representative of the call history list and the at least one previously called party, wherein the audio message includes one of a telephone number corresponding to the at least one previously called party and a name corresponding to the at least one previously called party;
    receiving an input corresponding to the at least one previously called party; and
    initiating a call to the at least one previously called party.

2. The method of claim 1, wherein the input includes at least one dialed key input.

3. The method of claim 1, wherein the service code comprises a vertical service code.

4. The method of claim 1, wherein the service code consists of fewer than seven dialed keys.

5. A telecommunication device configured to facilitate communication to a previously called party, the device comprising:
    a telephone network element configured to
        generate a call history list utilizing received calling party identification information;
        received a dialed service code and the calling party identification information;
        retrieve the call history list including at least one previously called party utilizing the dialed service code and the calling party identification information;
        generate an audio message representative of the call history list and the at least one previously called party, wherein the audio message includes one of a telephone number corresponding to the at least one previously called party and a name corresponding to the at least one previously called party; and initiate a call to the at least one previously called party, in response to a received input selection corresponding to the at least one previously called party.

6. The device of claim 5, wherein the input selection includes at least one dialed key input.

7. The device of claim 5, wherein the service code comprises a vertical service code.

8. The device of claim 5, wherein the service code consists of fewer than seven dialed keys.

9. The device of claim 5, wherein the telephone network element further comprises:

a processor;

a memory in communication with the processor, the memory storing computer-readable instructions executable by the processor.

10. The device of claim 5, wherein the received selected party input is a dual-tone multi-frequency signal.

11. The device of claim 5, wherein the received selected party input is an audible signal.

* * * * *